(12) United States Patent
Loomis (10) Patent No.: US 9,773,405 B2
(45) Date of Patent: Sep. 26, 2017

(54) REAL-TIME DEPLOYMENT OF INCIDENT RESPONSE ROADMAP

(71) Applicant: CyberSponse, Inc., Chandler, AZ (US)

(72) Inventor: Joseph Loomis, Scottsdale, AZ (US)

(73) Assignee: Cybersponse, Inc., Arlington, VA (US)

( * ) Notice: Subject to any disclaimer, the term of this patent is extended or adjusted under 35 U.S.C. 154(b) by 0 days.

(21) Appl. No.: 14/216,570

(22) Filed: Mar. 17, 2014

(65) Prior Publication Data

US 2014/0278664 A1    Sep. 18, 2014

Related U.S. Application Data

(60) Provisional application No. 61/799,882, filed on Mar. 15, 2013.

(51) Int. Cl.

| | | |
|---|---|---|
| G09G 5/00 | (2006.01) |
| G08B 27/00 | (2006.01) |
| G06Q 10/06 | (2012.01) |
| G06Q 50/26 | (2012.01) |
| G05B 23/02 | (2006.01) |
| H04M 1/725 | (2006.01) |
| G06T 19/00 | (2011.01) |
| G08B 25/14 | (2006.01) |
| G06F 17/30 | (2006.01) |

(52) U.S. Cl.
CPC ....... *G08B 27/001* (2013.01); *G05B 23/0272* (2013.01); *G06Q 10/063118* (2013.01); *G06Q 50/265* (2013.01); *G06T 19/006* (2013.01); *G08B 25/14* (2013.01); *H04M 1/72536* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,280,271 A * | 1/1994 | Berra | 340/525 |
| 5,408,330 A | 4/1995 | Squicciarini et al. | |
| 5,414,408 A * | 5/1995 | Berra | 340/525 |
| 5,796,942 A | 8/1998 | Esbensen | |
| 6,169,476 B1 * | 1/2001 | Flanagan | 340/286.02 |
| 6,604,126 B2 * | 8/2003 | Neiman et al. | 709/203 |
| 6,754,674 B2 | 6/2004 | Meyers et al. | |

(Continued)

OTHER PUBLICATIONS

International Search Report issued in International Application No. PCT/US2016/030688 dated Jun. 21, 2016.

(Continued)

*Primary Examiner* — Gurkanwaljit Singh
(74) *Attorney, Agent, or Firm* — Law Office of Lance C. Venable, PLLC (57) ABSTRACT

In various representative aspects, a method and a system that guide an incident response team to efficiently respond to an information security incident based on a roadmap are disclosed herein. A delegated incident response lead may oversee the whole process, including the creation of the roadmap, the performance of the team members, and the statuses of all tasks. When an incident occurs, incident response team members are notified, and delegated tasks in the roadmap are laid out. With a secure collaboration platform, the incident response team may work together in a secure, uncompromised environment.

25 Claims, 6 Drawing Sheets

(56) References Cited

U.S. PATENT DOCUMENTS

| | | | |
|---|---|---|---|
| 6,937,147 B2 * | 8/2005 | Dilbeck et al. | 340/506 |
| 7,051,244 B2 | 5/2006 | Fisher et al. | |
| 7,111,164 B2 | 9/2006 | Kinoshita | |
| 7,159,237 B2 | 1/2007 | Schneier et al. | |
| 7,340,594 B2 | 3/2008 | First et al. | |
| 7,379,879 B1 | 5/2008 | Sloo | |
| 7,571,179 B2 | 8/2009 | Meyers et al. | |
| 7,898,410 B2 * | 3/2011 | Schurter | 340/539.18 |
| 7,921,459 B2 | 4/2011 | Houston et al. | |
| 8,009,810 B2 * | 8/2011 | Seidberg et al. | 379/37 |
| 8,040,246 B2 | 10/2011 | Graves et al. | |
| 8,184,795 B2 * | 5/2012 | Keller et al. | 379/212.01 |
| 8,225,407 B1 | 7/2012 | Thrower et al. | |
| 8,228,176 B2 | 7/2012 | Lewis | |
| 8,280,344 B2 * | 10/2012 | O'Reilly | 455/404.2 |
| 8,311,863 B1 * | 11/2012 | Kemp | 705/7.11 |
| 8,314,683 B2 | 11/2012 | Pfeffer | |
| 8,368,754 B2 | 2/2013 | Flores et al. | |
| 8,417,553 B2 | 4/2013 | Putra et al. | |
| 8,451,983 B2 * | 5/2013 | Hulls | 379/37 |
| 8,462,914 B2 | 6/2013 | Ragno et al. | |
| 8,549,028 B1 | 10/2013 | Alon et al. | |
| 8,634,799 B1 | 1/2014 | Economy et al. | |
| 8,732,534 B2 | 5/2014 | Kini et al. | |
| 8,732,840 B2 | 5/2014 | Howes et al. | |
| 8,850,565 B2 | 9/2014 | Patrick et al. | |
| 8,935,153 B2 | 1/2015 | McKeeman et al. | |
| 8,943,366 B2 | 1/2015 | Carey et al. | |
| 8,954,811 B2 | 2/2015 | Carey et al. | |
| 8,970,354 B2 | 3/2015 | Lewis | |
| 2003/0225843 A1 * | 12/2003 | Sakata | 709/206 |
| 2005/0015222 A1 | 1/2005 | Harrington | |
| 2005/0091368 A1 * | 4/2005 | Ozburn | 709/224 |
| 2005/0149366 A1 * | 7/2005 | Wagner et al. | 705/7 |
| 2005/0257269 A1 | 11/2005 | Chari et al. | |
| 2006/0020500 A1 * | 1/2006 | Turner | 705/7 |
| 2006/0080656 A1 * | 4/2006 | Cain et al. | 717/174 |
| 2007/0103294 A1 | 5/2007 | Bonecutter et al. | |
| 2007/0107041 A1 | 5/2007 | Kayashima et al. | |
| 2007/0132836 A1 * | 6/2007 | Katz | 348/14.01 |
| 2007/0180490 A1 * | 8/2007 | Renzi et al. | 726/1 |
| 2008/0040191 A1 | 2/2008 | Chakravarty et al. | |
| 2008/0043744 A1 * | 2/2008 | Keller et al. | 370/395.2 |
| 2008/0056233 A1 | 3/2008 | Ijidakinro et al. | |
| 2009/0046837 A1 | 2/2009 | Thiel | |
| 2009/0105995 A1 | 4/2009 | Harrington | |
| 2009/0228501 A1 | 9/2009 | Shockro et al. | |
| 2009/0251545 A1 | 10/2009 | Shekarri et al. | |
| 2009/0276489 A1 | 11/2009 | Ragno et al. | |
| 2009/0298461 A1 * | 12/2009 | O'Reilly | 455/404.2 |
| 2010/0070323 A1 * | 3/2010 | Polcari et al. | 705/8 |
| 2010/0325107 A1 * | 12/2010 | Kenton et al. | 707/723 |
| 2011/0087510 A1 | 4/2011 | Putra | |
| 2011/0143707 A1 | 6/2011 | Darby, Jr. et al. | |
| 2012/0123758 A1 | 5/2012 | Kevan | |
| 2012/0194418 A1 * | 8/2012 | Osterhout et al. | 345/156 |
| 2012/0198414 A1 * | 8/2012 | Chen et al. | 717/102 |
| 2012/0286932 A1 | 11/2012 | Lewis | |
| 2013/0014264 A1 * | 1/2013 | Kennedy et al. | 726/25 |
| 2013/0065628 A1 | 3/2013 | Pfeffer | |
| 2013/0091209 A1 * | 4/2013 | Bennett et al. | 709/204 |
| 2013/0262082 A1 | 10/2013 | McKeeman et al. | |
| 2013/0297364 A1 | 11/2013 | Putra | |
| 2013/0346440 A1 | 12/2013 | Alon et al. | |
| 2014/0040673 A1 | 2/2014 | Carey et al. | |
| 2014/0045445 A1 * | 2/2014 | Assuncao et al. | 455/404.1 |
| 2014/0047273 A1 | 2/2014 | Carey et al. | |
| 2014/0089039 A1 | 3/2014 | McClellan | |
| 2014/0114713 A1 | 4/2014 | Simhon et al. | |
| 2014/0120888 A1 * | 5/2014 | Bhegade | 455/416 |
| 2014/0214744 A1 | 7/2014 | Froelich | |
| 2014/0223567 A1 | 8/2014 | Howes et al. | |
| 2014/0250125 A1 | 9/2014 | Stuempfle et al. | |
| 2014/0278664 A1 | 9/2014 | Loomis | |
| 2014/0282353 A1 | 9/2014 | Jubran | |
| 2014/0358608 A1 | 12/2014 | Bianchi et al. | |
| 2015/0092928 A1 | 4/2015 | Jensen et al. | |
| 2015/0099537 A1 | 4/2015 | Merithew | |
| 2015/0145696 A1 | 5/2015 | Seo et al. | |
| 2015/0235164 A1 | 8/2015 | Key | |
| 2015/0242625 A1 | 8/2015 | Cassidy et al. | |
| 2016/0149948 A1 | 5/2016 | Loomis et al. | |

OTHER PUBLICATIONS

Written Opinion issued in International Application No. PCT/US2016/030688 dated Jun. 21, 2016.

Image File Wrapper of U.S. Appl. No. 14/630,383 electronically captured on Jan. 18, 2017.

Image File Wrapper of U.S. Appl. No. 14/703,881 electronically captured on Jan. 18, 2017.

Image File Wrapper of U.S. Appl. No. 14/866,198 electronically captured on Jan. 18, 2017.

* cited by examiner

REAL-TIME DEPLOYMENT OF INCIDENT RESPONSE ROADMAP

CROSS-REFERENCE TO RELATED APPLICATIONS

The present application claims priority from prior provisional applications: Ser. No. 61/799,882, filed Mar. 15, 2013, entitled "A System and Method for Guiding Teams through the Information Security Incident Response Process in a Detached, Secure Environment," the content of which is incorporated herein in its entirety by this reference and is not admitted to be prior art with respect to the present invention by the mention in this cross-reference section.

BACKGROUND

The present invention relates generally to providing methods and systems for real-time deployment of an incident response plan. More specifically, the invention relates to methods and systems for guiding a team of users to implement a pre-determined roadmap in order to resolve an identified incident.

Cyber crime is a serious and rapidly growing threat. All companies with computer assets on a network exposed to the Internet are at risk of being victimized by cyber criminals, which may result in a major data breach compromising their own data and those of their customers. When breaches like these occur, they have a significant negative impact on a business' bottom line and future earning potential.

Technology to detect cyber criminal activity is being developed and evolved each day, but so are the methods criminals are using to attack. Because of this, it is impossible to prevent all attacks or know exactly what they will look like should they occur. The question then becomes how well prepared a company is to respond to a threat or breach. This can mean the difference between a major breach that lasts weeks, and a minor incident that lasts only days because the team is well prepared.

Therefore, methods and systems for mobilizing and guiding an incident response team to detect, analyze, contain, eradicate, and recover from a threat such as a data breach through a pre-defined set of tasks are needed. Preferably, the methods and systems also provide a simulation mechanism before actual events occur so that the team is familiar with the tasks, processes and systems and thus can act efficiently.

SUMMARY

A summary provided below is only for purposes of introducing embodiments of the invention. The ultimate scope of the invention is to be limited only to the claims that follow the specification.

For the purpose of this application, the terms "security event" and "event" are defined as "data concerning an identified occurrence from a single source that may or may not have an adverse impact on a system or network." Events may include system crashes, packet floods, unauthorized use of system privileges, unauthorized access to sensitive data, denial of service attacks, unauthorized code modifications, policy violations, virus infections, and execution of malware. Additionally, the terms "security incident" and "incident" are defined as "a set of data that is generated when one or more security events have been determined to have a significant likelihood of compromising or threatening a system or network and therefore a responsive action is needed."

This invention is embodied in a method and a system that use a roadmap to guide an incident response team to efficiently respond to an information security incident. The roadmap may be previously stored in a database or created on the fly by a user when an event occurs. An exemplary embodiment of this invention may comprise a computer that has access to a non-transitory storage medium and a database. The non-transitory storage medium, such as a hard drive, a DVD, and so forth, stores software programs to be executed on the computer. The database may store various incident response (IR) rules, IR team member list, and roadmaps. In a preferred embodiment, the entire incident response process is designed based on NIST, ISO, or SANS standard response methodologies, or any other desired custom response methodologies known in the art.

The incident response process begins when an event occurs. Upon receiving the event data, the computer in the exemplary embodiment may create an incident based on the event data. But if the new event data is considered relevant to a previous event data, the embodiment may correlate it to a pre-existing incident, rather than creating a new incident.

Event data may come from external sources, such as an external, third-party, intrusion detection system (IDS), security information manager (SIM), security event and information manager (SEIM), security event manager (SEM), antivirus software, or other similar systems. Event data may include date, time, severity, source, description, hostname, operating system, and IP address of the source. Event data from external sources may be normalized and saved into a format that is readable by the system. Alternatively, event data may be created manually when an administrator notices some threat (such as a computer is stolen from an office) and decides to begin the incident response process, or when a simulation is desired.

In an embodiment featuring simulations, when an event data is created for a simulation, the simulation may start immediately or instead commence at a certain date and time. A simulation may have various scenarios. For example, the human decision making parts of the incident response process may be set to be automatic so that a delegated IR Lead does not have to participate in the simulation. An IR Lead may be an IR team member, a system administrator, or merely a system user designated to overlook the process and administer the roadmaps and the rules in the database. Some tasks may be set to be performed in a dummy environment, so that the real system is not affected by the simulation. Preferably, a simulation may run covertly, so that the IR team members, or even the IR Lead as well, would not know that it is a simulation, which makes their reactions more realistic.

When a new incident is to be created, the exemplary embodiment may automatically create the incident or do so only if the priority of the event data is high. An embodiment may use an attribute, such as the "severity," of the event data or a pre-determined rule in the database to determine the priority of the event data. Alternatively, the embodiment may prompt the designated IR Lead to make the determination. The pre-determined rule may be as simple as categorizing all events from a notorious IP address as of high priority while the others low, or a more complicated rule that an administrator creates based on her experience and save in the database.

If an embodiment determines that the priority of the event data is low, the embodiment may not create an incident for the event data but merely archive the event data. Preferably, the embodiment would notify the IR Lead so that the IR Lead may have a chance to review the priority of the event data and optionally modify the priority and make the embodiment create an incident.

After an incident is created, the embodiment may notify the IR Lead and allow the IR Lead to edit various attributes of the incident. Exemplary incident attributes may include an incident name (or an identification number), an incident category (such as DDOS, Malware, etc.), a list of event data, a list of IR team members, a corresponding roadmap with at least a task assigned to at least one of the IR team members, and so forth. Depending on the implementation of the embodiments, the incident may be created with default values in all of its attributes based on the event data, including a default roadmap.

If default values are created for an incident, the IR Lead may be prompted to review the values and either accept the default settings and deploy the default roadmap as is or change the settings manually. In a preferred embodiment, when the IR Lead decides to change the settings, the IR Lead is guided step-by-step by a software program (a wizard) to set the attributes in an incident. The exemplary wizard may provide a list of incident category to choose from, ask a series of pre-programmed questions based on the incident category and the organization's Incident Response Policy, and recommend a list of tasks (by choosing from pre-existing template roadmaps or other processes of building a list of tasks) according to the answers to the questions for the IR Lead to assign to the IR team members, thus creating a roadmap for this incident. After a roadmap is modified, the IR Lead may save the updated roadmap in the database for this category of incidents as a new roadmap or replace the default roadmap.

Once the roadmap is determined, the embodiment may deploy the roadmap by notifying the IR team members of their delegated tasks. The IR team members may be notified by emails, SMS messages, or any other means of communication. In a preferred embodiment, the system allows the IR team members to choose their preferred notification methods and notifies the IR team members accordingly. The IR team members may have to login to the collaboration system of the preferred embodiment to see the delegated task list.

Based on the implementations of the invention, an IR team member may be able to see, preferably, all of the tasks in the roadmap or only the tasks delegated to her. Either way, the IR Lead is preferably allowed to see all the tasks in the roadmap and their statuses. If the IR team members are also allowed to see all the tasks in the roadmap and the tasks' statuses, they may have a better understanding of the whole situation and may be able to coordinate with and help each other.

In addition, in some embodiments, some tasks may be contingent upon the completion of other tasks, which may be delegated to the same IR team member or different IR team members. In a situation like this, the embodiments may show only the delegated tasks that can be performed now and hide those contingent on other unfinished tasks. The hidden tasks are displayed when the status of the tasks they are contingent upon are "complete." Alternatively, the embodiments may show all the delegated tasks differently, such as in different colors. In addition, in some embodiments, a task may be delegated to two or more IR team members and is considered complete when either of the delegated IR team members finishes the task. In such embodiments, it may be preferred that the IR team members are made aware of this duplication (e.g. the delegated tasks are displayed differently) and coordinate with each other to finish the task.

Furthermore, the system may monitor the status of each delegated task. In some embodiments, the status of a delegated task is manually reported by the IR team member, while in other embodiments, the system may check the status of a delegated task by monitoring if the task has been performed or if the desired result has been achieved.

Additionally, it is preferred that the embodiments provide a collaboration platform to facilitate speedy and efficient response by the IR team members. The collaboration platform may include chat functionality, messaging, internal notifications, document sharing, calendaring, access to pre-existing incident response policies, as well as the ability to generate external email and SMS notifications. A preferred embodiment may provide chat features, allowing IR team members to communicate directly via chat with screen sharing and white-boarding capabilities, and thus serve as a "war room" should a serious incident occur. The preferred embodiment may also allow IR team members to send/receive messages to/from each other, and use the messaging features as a repository for system messages and announcements Some embodiments may allow documents to be shared, including IR Policies, network maps, and memorandum templates. In a preferred embodiment, users can store incident response-related information in the database so they have access to it in the event of a breach. The documents may have versioning, date, time, and user stamping. In addition, a live stream of everything taking place in the system may be provided, with views tailored based on permissions. The preferred embodiment may also provide an emergency contact list to ensure that all users in the system have quick access to the chain of command in an emergency. In the preferred embodiment, each user is required to assign themselves backups in the event of their detainment should they be assigned to be a primary Point of Contact (POC). This information may be accessible to users at all times.

The collaboration platform is preferably executed on a secure server, completely separate from the potentially compromised network. Thus, the IR team members can be confident that their communications are secure. Moreover, the collaboration platform may allow communication to pre-defined external users, such as law enforcement.

Finally, some embodiments may provide an evidence capture mechanism—that is, a digital Chain of Custody for evidence. "Evidence" refers to a resource, such as a log file, an online asset, and so forth, that an IR team member may access and use white she has the custody. Based on how the embodiments are implemented, an IR team member, the IR Lead, or an administrator may be allowed to create new evidence, or modify or delete existing evidence according to permission.

In an embodiment with evidence capture features, a new evidence entry for a file may be created by uploading the file to and creating a Chain of Custody form for that evidence in an evidence repository (in a database). The data in a Chain of Custody form may include any date received, time received, date discovered, time discovered, date reported, time reported, date captured, time captured, date in, time in, current location, location gathered, location received, location sent, date out, time out, transportation method, shipment method, tracking information, sender, recipient, status, type, and any other information related to the history of the evidence. A user, such as an administrator or an IR team member, may need to fill in the Chain of Custody form to gain access to that evidence, and describe in the Chain of Custody form what has been done to the evidence before relinquishing the evidence. This way, the history of the evidence usage is recorded and may be used for tracking or undoing some changes made to the evidence in the future.

In an exemplary system, in order to track the Chain of Custody of a piece of evidence, a user may be required to enter information in the Chain of Custody form. The data in the form may be attached to the database entry for a piece of evidence and remain with it as part of that evidence's Chain of Custody history. As each piece of evidence is reviewed, moved, or otherwise transferred, the user may be prompted to enter new values to be associated with the evidence. When the evidence is something stored within the exemplary system, such as a log file, malware artifact, error message, or any other similar data that could be classified as evidence, the data may be filled in automatically by the system. In the case of evidence that exists outside of the system, the user may be required to enter new Chain of Custody values manually.

While the embodiments are illustrated above for handling a single incident, it should be noted that the system can be designed to handle many events and incidents simultaneously. Regardless of the progress made on a previous incident, new events can trigger the creation of new incidents and deployment of new incident roadmap. The system may allow its users to be able to handle multiple incidents at the same time, always maintaining awareness of potential network security breaches.

In sum, it is an object of this invention to identify important events and quickly mobilize the right people to handle them.

Another object of this invention is to provide a recommended incident response roadmap while allowing manually editing the roadmap.

BRIEF DESCRIPTION

A more complete understanding of the present invention may be derived by referring to the detailed description and claims when considered in connection with the following illustrative figures. In the following figures, like reference numbers refer to similar elements and steps throughout the figures.

DETAILED DESCRIPTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the inventions is not limited to the examples that are described below.

Figure 1:
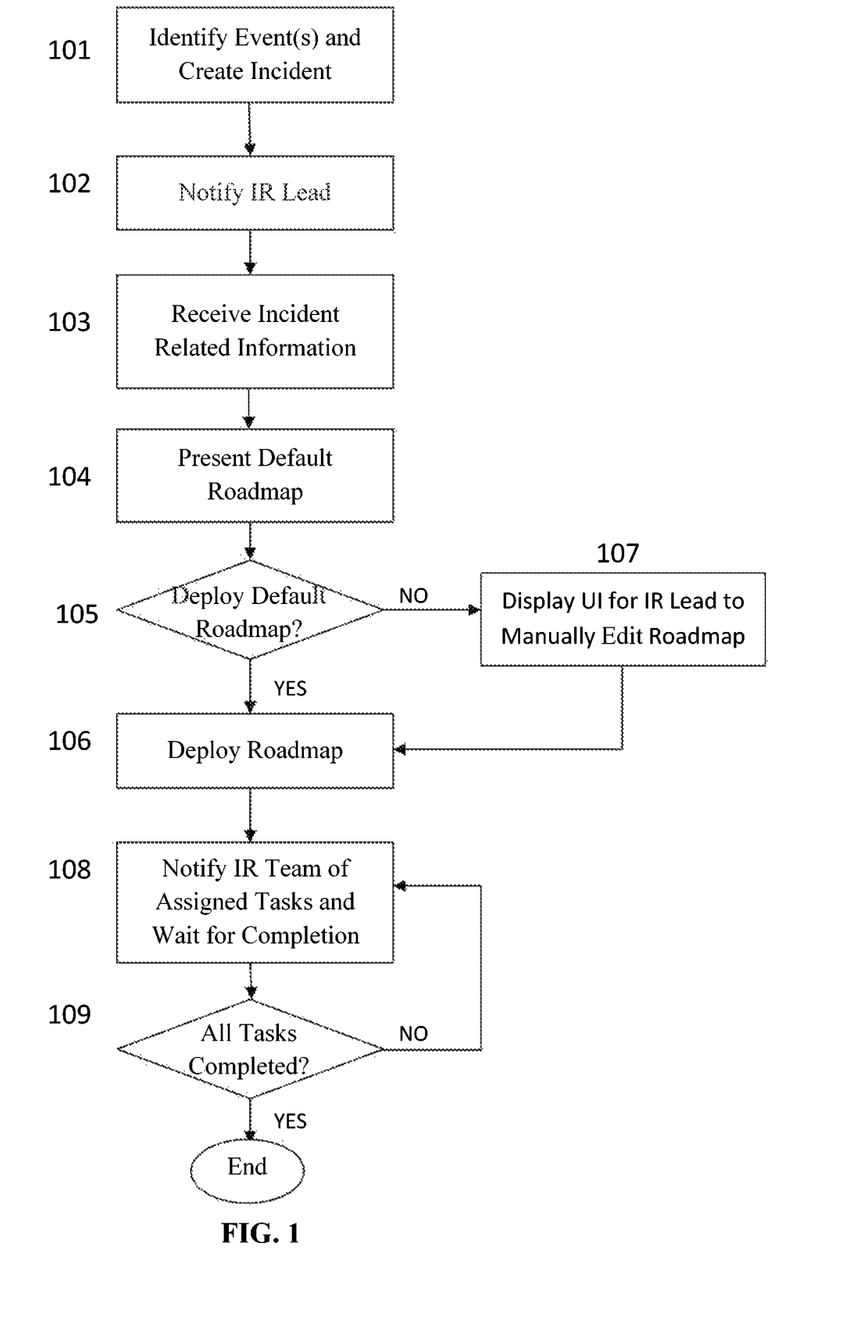
FIG. 1 is a process flow diagram illustrating the incident response process in one embodiment.

FIG. 1 shows a high-level overview of how an incident progresses from an event (or series of events) into a response roadmap in an exemplary embodiment. In step 101, event data is collected and identified. In an exemplary embodiment, the system automatically creates an incident corresponding to the incoming event(s). Some other embodiments may include human determination of priority of the event data and whether an incident is to be created. Alternatively, an embodiment may categorize different events into different pre-determined priority levels. For example, system crashes and virus infections may be deemed the highest high priority events while packet floods may be of a lower priority.

In a preferred embodiment, events with a high priority level automatically trigger the creation of an incident. As to lower priority events, the system may not create a corresponding incident but only notify a user, such as the IR Lead, to determine if it is a false alarm. If it is found to be a false alarm, no incident is created, and the IR Lead may choose to archive the data. If the event is deemed to be serious, the IR Lead may correlate the event to a preexisting incident of relevant events or create an incident for this event.

The embodiment in FIG. 1 notifies the IR Lead of the new incident in step 102. The IR Lead may then in step 103 be walked through a series of pre-determined questions, such as what the priority of the incident is, which incident category it should be assigned, how many IR team members and who should participate in handing this incident, and how the IR team should prioritize the handling of this incident,[1] etc. Based on the attributes set in step 103, the embodiment in step 104 generates or retrieves from the database a default roadmap with pre-defined tasks delegated to a default group of IR team members.

[1] Examples of the questions regarding the attributes of an incident may be found in NAT'L INST. OF STANDARDS AND TECH., COMPUTER SECURITY INCIDENT HANDLING GUIDE §§2.4.3 & 3.2.6, (Special Publ'n 800-61, Rev. 2, 2012).

In step 105, the default roadmap is presented to the IR Lead so that the IR Lead may decide to accept the default roadmap as is or to activate the roadmap editing user interface. The roadmap editing user interface in step 107 allows the IR Lead to edit the list of IR team members, create or edit tasks, and delegate a task to one or more IR team members. The IR Lead may also be able to edit the relationships between the tasks, such as whether one task can be performed at the same time or is contingent on the completion of another task. Once chosen, the roadmap is deployed in step 106. Users are notified of their tasks in step 108 until all tasks are complete in step 109. Then the incident is deemed resolved.

Figure 1A:
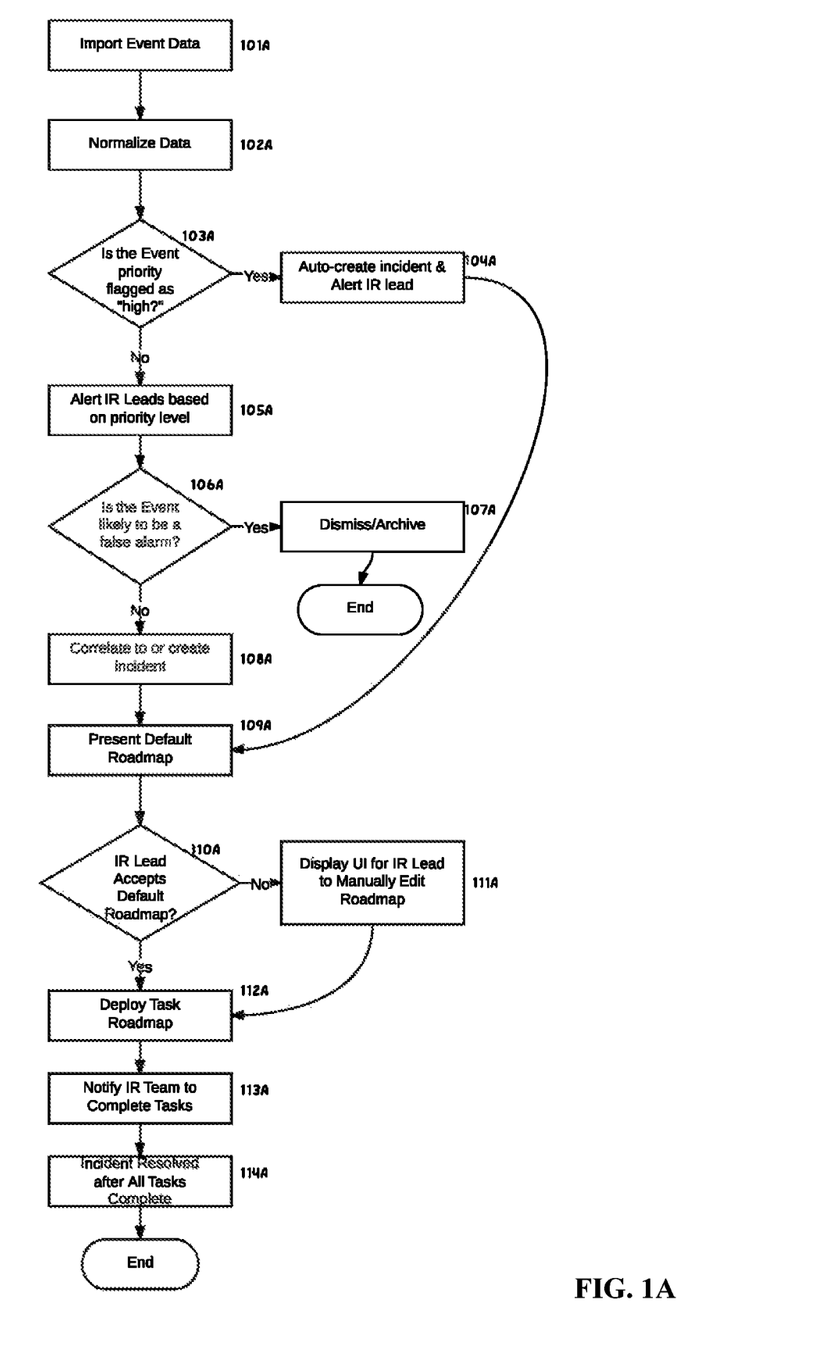
FIG. 1A is a flow chart of an incident response process in another embodiment that receives event data from an external source.

FIG. 1A illustrates a flow chart of roadmap deployment process in another embodiment. In step 101A, the embodiment receives event data imported from an external server, such as an IDS system, SIM system, and so forth. Then in step 102A, the imported data is normalized for processing. The embodiment first checks whether the event has a high priority (determined in step 103A). If so, an incident is automatically created in step 104A, and the IR Lead is notified. If the embodiment finds that the priority is not high, the IR Lead is notified (step 105A) to determine whether the event is likely a false alarm (step 106A). A false alarm can be dismissed and optionally archived for future tracking in step 107A. If the IR Lead decides that the event is not a false alarm in step 106A, the event may be correlated to an existing incident or a new incident may be created for this event in step 108A.

After the incident is created, the embodiment first chooses a default roadmap and presents it to the IR Lead in step 109A. The IR Lead may accept the default roadmap or decides to manually edit the roadmap or create a new roadmap in step 110A. The embodiment may include a user interface for the IR Lead to edit the roadmap in step 111A, just as step 107 of the previous embodiment in FIG. 1. After the roadmap is chosen, the roadmap is deployed in step 112A, and IR team members in the roadmap are notified of their delegated tasks in step 113A, as in step 106 and 108 of FIG. 1. After all tasks are complete, the incident is considered resolved in step 114A.

In some embodiments, the IR Lead may additionally be notified of the completion of the process and can review the process by a comprehensive report of the whole process or a report of a specific task. The report can be useful for reviewing the IR team's performance or for improving the roadmap in the future.

Figure 2:
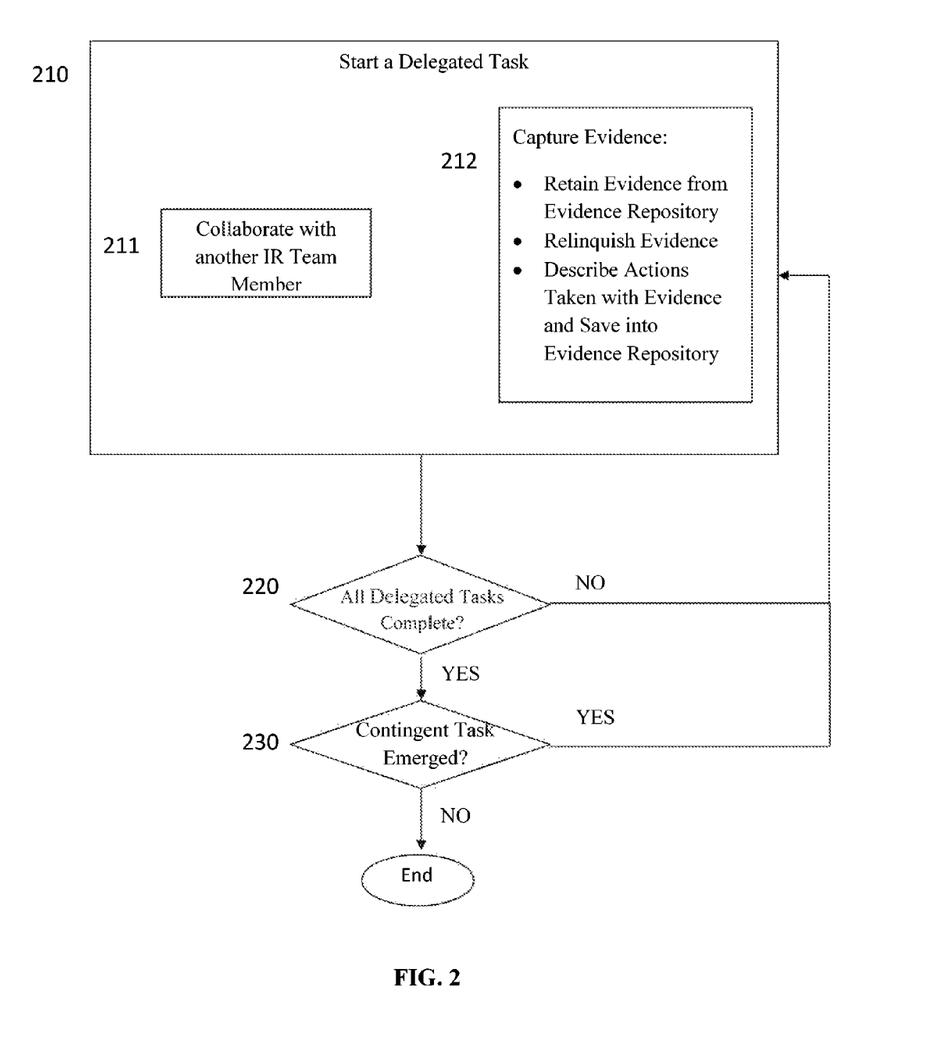
FIG. 2 illustrates a process of how an IR Team Member performs the delegated tasks in one embodiment.

FIG. 2 illustrates a flow chart of how an IR team member carries out her delegated tasks in a roadmap of an embodiment. The IR team member starts performing a delegated task in step 210. While the IR team member is working, she may need to collaborate with other team members in step 211 using a secure collaboration platform provided in the embodiment, such as chatting, messaging, document sharing, and so forth. The IR team member may also need to access certain assets such as a file that are classified as evidence. The process of accessing the evidence is called to "capture evidence" in step 212, which includes filling the Chain of Custody form and retaining evidence from a database of evidence, called "Evidence Repository," and is further illustrated in FIG. 4.

After the IR team member is done with the evidence, either by editing it or merely reading it, the evidence must be relinquished, such as closing or saving and closing a file. The IR team member would also be required to report what has been done to the evidence by saving a note in the chain of custody form in the Evidence Repository. In another embodiment, the system may in addition include a version control mechanism for automatically saving the changes made to an online file to the Chain of Custody form.

After a delegated task is complete in step 210, this embodiment may automatically update the status of the delegated task or let the IR team member report that the task is complete. Then the IR team member checks if her list of unfinished delegated tasks is now empty in step 220. If not, she will perform her next task in the list (back to step 210). But if the list is empty, she checks in step 230 if there are new delegated tasks not shown in her old list because they were contingent on other team members' or her own tasks. If no more tasks are delegated to her, the IR team member has finished all her work relating to the incident.

Finally, it is to be understood that the illustration in FIG. 2 is a simplified process. In some embodiments, contingent tasks are added to the list of unfinished delegated tasks while the IR team member is still carrying out a delegated task. So the list is not static but may change while the IR team is working on a task. Therefore, in addition to the list of current delegated tasks, some embodiments may allow IR team members to see the whole roadmap to have a better understanding of what to expect next.

Figure 3:
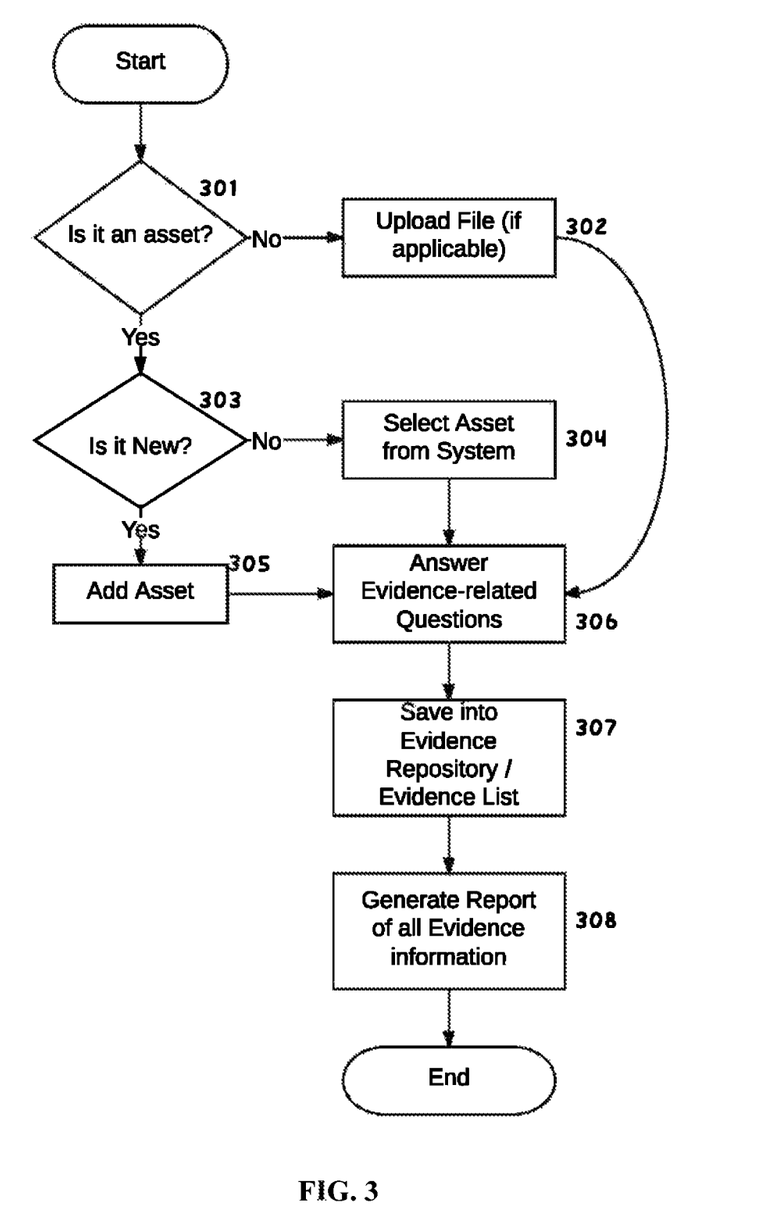
FIG. 3 illustrates a workflow for creating evidence in an embodiment.

FIG. 3 shows an exemplary workflow for adding and logging new evidence. The evidence creation process begins by determining whether the new evidence is an asset in step 301. If the user determines that the new evidence is not an asset (i.e. a log file) in step 301, the user can upload the file in step 302. If the new evidence is an existing asset (such as a server, a device, a password file, and so forth) (steps 301 & 303), the user finds it in the system in step 304. If it is not an existing asset, the user can add it to an evidence list (an Evidence Repository) in step 305.

Upon entering new evidence, the user may be prompted to answer a series of questions, such as those recommended by NIST, in step 306. Some examples of the questions include: how a piece of evidence is acquired, where the evidence should be stored, and how long the evidence may be retained.[2] The answers to these questions may become some parts of the data in the Chain of Custody form for this evidence. Alternatively, the user may be given a blank form to fill in the information relevant to the evidence, such as the date and time that the evidence is received, discovered, date reported, captured and checked-in or out, as well as its current location, tracking information, and evidence type.

[2] See Id. at §§3.3.2 & 3.4.3.

Once complete, the evidence data is retained in the evidence list (the Evidence Repository) within the system in step 307. Afterwards, the user may have the option of generating a report—either a complete report of the Chain of Custody for any piece of evidence at any time or a comprehensive set of Chain of Custody forms for all evidence related to the incident (step 308).

Figure 4:
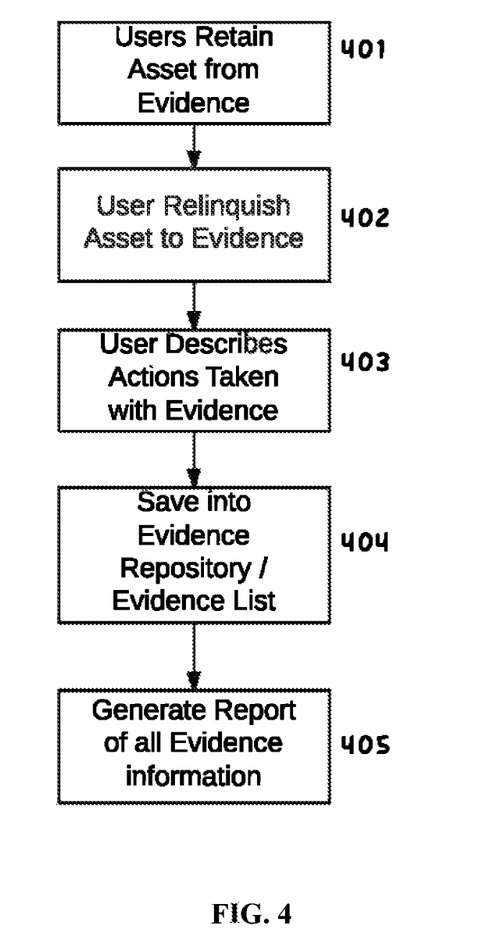
FIG. 4 illustrates an exemplary workflow for capturing asset evidence in an embodiment.

FIG. 4 illustrates an exemplary workflow for capturing asset evidence. After an asset is entered as evidence, in order to access the asset evidence, the user may be required to formally capture the asset evidence by retaining (step 401) and relinquishing (step 402) the asset via a digital Chain of Custody form. To retain the asset evidence in step 401, the user may be prompted to provide certain information, such as the location the asset is received and the date the asset is captured, or alternatively the embodiment would provide and save the information automatically. Upon relinquishing evidence, the user may again be required to record actions taken in step 403. The description in step 310 and, if applicable, the content of the asset evidence may be saved back to the Evidence Repository in step 404. Like in step 308 in FIG. 3, the user may have the option of generating a report in step 405.

Figure 5:
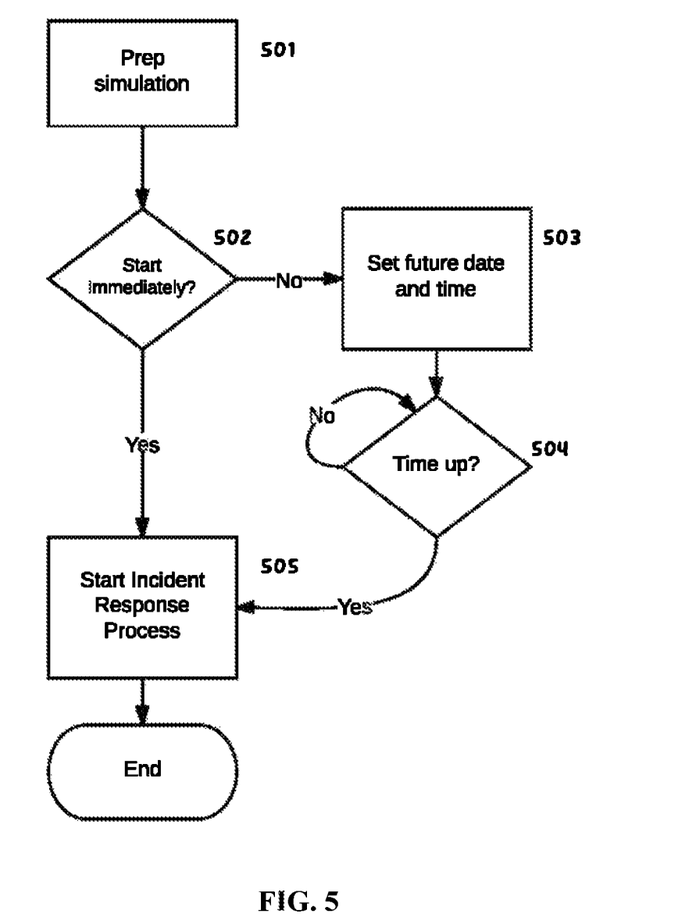
FIG. 5 shows a flow chart of a simulation in one embodiment.

FIG. 5 illustrates the process of a simulation in one embodiment. In step 501, the simulation data is prepared by a user, such as an administrator or the IR Lead, by either choosing from a pre-defined set of scenarios or manually create a scenario. The features of the simulation to be set may include a set of event data, whether the IR Lead will participate in the simulation, whether the IR team members will be notified that the process is merely a simulation, or whether a dummy database for simulation will replace the actual database, and so on. Then the user may determine whether to start the simulation immediately in step 502. If the simulation is to be executed in the future, the date and time is set on a timer in step 503, and the simulation will commence when the time comes (step 504). When the simulation starts in step 505, the incident response process, such as that shown in FIG. 1 or FIG. 1A, will be implemented according to the simulation scenario planned in step 501.

While the invention has been described by means of specific embodiments, numerous modifications and variations could be made thereto by those ordinarily skilled in the system development field without departing from the score and spirit of the invention set for the in the claims.

What is claimed is:

1. A system for guiding an incident response (IR) team member comprising:
a computer having a processor;
a database coupled to the computer;
a non-transitory processor-readable storage medium coupled to the computer and storing executable instructions;
wherein the non-transitory processor-readable storage medium and the executable instructions are configured to, with the processor, cause the system at least to:
receive event data, wherein the event data comprises data concerning an identified occurrence, from a single system or network source, that may or may not have an adverse impact on the system or the network, the source comprising one or more of an intrusion detection system, a security information manager, a security event and information manager, a security event manager, an antivirus system, or other cyber-security system;
normalize the event data from a format used by the source to a standard format for processing;
process the normalized event data to determine a priority for the identified occurrence;
in response to determining the priority is above a threshold level, create an incident based on the event data, wherein the incident comprises a set of data that is generated when one or more security events has been determined to have a significant likelihood of compromising or threatening the system or the network and has been determined to require a responsive action;
notify an IR Lead of the incident;
display an incident editing user interface configured to allow the IR Lead to modify an attribute of the incident;
associate the incident to a roadmap pre-existing in the database, based on the attribute of the incident;
display a roadmap editing user interface configured to allow the IR Lead to modify the roadmap;
deploy the roadmap by notifying the IR team member of at least one delegated task in the roadmap and transmitting data relevant to the delegated task to a computer used by the IR team member to perform the delegated task;
automatically monitor a status of the delegated task by monitoring the computer used by the IR team member to perform the delegated task; and
update and display the status of the delegated task to the IR Lead and the IR team member.

2. The system of claim 1, wherein the computer is further coupled to a second computer and is configured to receive the event data from the second computer.

3. The system of claim 1, wherein the event data is manually created.

4. The system of claim 3, further comprising a timer, wherein the timer is configured to permit an administrator to set a time to start a simulation with the event data.

5. The system of claim 1, wherein the attribute of the incident is an incident type.

6. The system of claim 1, wherein the attribute of the incident is set to an answer by the IR Lead to a question relating to the event data that the incident editing user interface pulls from the database.

7. The system of claim 1, wherein the roadmap editing user interface is further configured to:

allow the IR Lead to create a second roadmap, store the second roadmap in the database, and replace the roadmap by the second roadmap;
allow the IR Lead to replace the roadmap by a third roadmap pre-existing in the database;
allow the IR Lead to create the delegated task in the roadmap and assign the delegated task to the IR team member;
allow the IR Lead to delete the delegated task; and
allow the IR Lead to delegate the delegated task to a second IR team member.

8. The system of claim 1, further comprising:
a secure communication platform for the IR team member to communicate with a second IR team member via at least one of online chat, messaging, internal notifications, document sharing, screen share, whiteboard, calendaring, external email, or SMS notifications.

9. The system of claim 1, wherein the non-transitory processor-readable storage medium and the executable instructions are further configured to, with the processor, cause the system at least to display the status of the delegated task to a second IR team member.

10. The system of claim 1, wherein the non-transitory processor-readable storage medium and the executable instructions are further configured to, with the processor, cause the system at least to display only the delegated task that is not contingent upon an unfinished second task in the roadmap, when notifying the IR team member of the delegated task in the roadmap.

11. The system of claim 1, wherein the non-transitory processor-readable storage medium and the executable instructions are further configured to, with the processor, cause the system at least to allow the IR team member to create an evidence in the database by:
receiving data relating to the evidence and saving the data to a chain of custody form in the database;
when the evidence points to a resource not yet existing in the system, then creating the resource; and
saving the location of the resource to the database.

12. The system of claim 11, wherein the non-transitory processor-readable storage medium and the executable instructions are further configured to, with the processor, cause the system at least to:
allow the IR team member to retain the evidence stored in the database by filling in the chain of custody form and accessing the evidence; and
receive a description by the IR team member and save the description to the chain of custody form to the database.

13. A method for guiding an incident response (IR) team member comprising:
receiving event data at a computer configured for incident response, wherein the event data comprises data concerning an identified occurrence, from a single system or network source, that may or may not have an adverse impact on the system or the network, the source comprising one or more of an intrusion detection system, a security information manager, a security event and information manager, a security event manager, an antivirus system, or other cyber-security system;
normalizing, by the computer configured for incident response, the event data from a format used by the source to a standard format for processing;
processing, by the computer configured for incident response, the normalized event data to determine a priority for the identified occurrence;
in response to determining the priority is above a threshold level, creating, by the computer configured for incident response, an incident based on the event data, wherein the incident comprises a set of data that is generated when one or more security events has been determined to have a significant likelihood of compromising or threatening the system or the network and has been determined to require a responsive action;

notifying, by the computer configured for incident response, an IR Lead of the incident;

displaying, by the computer configured for incident response, an incident editing user interface configured to allow the IR Lead to modify an attribute of the incident;

associating, by the computer configured for incident response, the incident to a roadmap pre-existing in a database, based on the attribute of the incident;

displaying, by the computer configured for incident response, a roadmap editing user interface configured to allow the IR Lead to modify the roadmap;

deploying, by the computer configured for incident response, the roadmap by notifying the IR team member of at least one delegated task in the roadmap and transmitting data relevant to the delegated task to a computer used by the IR team member to perform the delegated task;

automatically monitoring a status of the delegated task by monitoring the computer used by the IR team member to perform the delegated task; and updating and displaying the status of the delegated task to the IR Lead and the IR team member, by the computer configured for incident response.

14. The method of claim 13, further comprising:
receiving, by the computer configured for incident response, the event data from another computer.

15. The method of claim 13, further comprising: displaying, by the computer configured for incident response, a user interface for manually creating the event data.

16. The method of claim 15, further comprising: allowing, by the user interface, an administrator to set a time to start a simulation with the event data.

17. The method of claim 13, wherein the attribute of the incident is an incident type.

18. The method of claim 13, wherein the attribute of the incident is set to an answer by the IR Lead to a question relating to the event data that the incident editing user interface pulls from the database.

19. The method of claim 14, wherein the roadmap editing user interface is further configured to:
allow the IR Lead to create a second roadmap, store the second roadmap in the database, and replace the roadmap by the second roadmap;
allow the IR Lead to replace the roadmap by a third roadmap pre-existing in the database;
allow the IR Lead to create the delegated task in the roadmap and assign the delegated task to the IR team member;
allow the IR Lead to delete the delegated task; and
allow the IR Lead to delegate the delegated task to a second IR team member.

20. The method of claim 13, further comprising:
providing, by the computer configured for incident response, a secure communication platform for the IR team member to communicate with a second IR team member via a communication means selected from the group consisting of online chat, messaging, internal notifications, document sharing, screen share, whiteboard, calendaring, external email, SMS notifications, and combinations thereof.

21. The method of claim 13, further comprising: displaying, by the computer configured for incident response, the status of the delegated task to a second IR team member.

22. The method of claim 13, further comprising: displaying, by the computer configured for incident response, to the IR team member only the delegated task that is not contingent upon an unfinished second task in the roadmap.

23. The method of claim 13, further comprising: allowing the IR team member to create an evidence in the database by:
receiving, by the computer configured for incident response, data relating to the evidence and saving the data to a chain of custody form in the database;
when the evidence points to a resource not yet existing in the system, then creating the resource, by the computer configured for incident response; and
saving, by the computer configured for incident response, the location of the resource to the database.

24. The method of claim 23, further comprising:
allowing, by the computer configured for incident response, the IR team member to retain the evidence stored in the database by filling in the chain of custody form and accessing the evidence; and
receiving a description by the IR team member and saving the description to the chain of custody form to the database, by the computer configured for incident response.

25. The system of claim 1, wherein the non-transitory processor-readable storage medium and the executable instructions are further configured to, with the processor, cause the system at least to:
provide an evidence capture mechanism, wherein the evidence capture mechanism is configured to maintain a digital chain of custody for evidence.

* * * * *